2,847,408
POLYMERIZATION OF ACRYLIC ACID NITRILE

Ernst Pirot, Erlenbach (Main), Germany, assignor to Vereinigte Glanzstoff - Fabriken Aktiengesellschaft, Wuppertal-Elberfeld, Germany, a joint-stock company of Germany No Drawing. Application December 14, 1953
Serial No. 398,227

Claims priority, application Germany December 18, 1952

3 Claims. (Cl. 260—88.7)

This invention relates to acrylic acid nitrile and more especially to a process of polymerization of acrylic acid nitrile itself or of mixtures of this nitrile with other vinyl compounds.

Hitherto in the polymerization of acrylic acid nitrile care has been taken to maintain the pH as well as the temperature in the reaction solution as constant as possible. It has also been suggested to carry polymerization through in the presence of activators such as for instance hydrogen peroxide or of redox systems such as for instance mixtures of a persulfate and bisulfite.

The polymerizates obtained in this manner are known to contain a certain percentage of low molecular compounds and to show a pronounced tendency to swell when dissolved in the conventional solvents so that the spinning solutions prepared from them offer some difficulties and the partly swollen polymerizates hamper the working up of these solutions. Apart from that, the solutions as well as the filaments and other products recovered from them are discolored.

I have now found that all these disturbances can be avoided if the polymerization of acrylic acid nitrile is carried out in two stages and within predetermined ranges of the pH and at predetermined temperatures and if during the second stage of the process sulfur dioxide is added.

In proceeding according to this invention I start the polymerization of acrylic acid nitrile or mixtures thereof with other vinyl compounds in the presence of per-compounds and sulfites at temperatures ranging between about 35° and 40° C., while taking care that the pH remain within the narrow range of from about 3.5 to 4.5.

Then follows the second stage, in which the temperature is raised to about 65°–80° C. and $SO_2$ is added, until the pH has risen to about 1 whereupon the reaction is continued with the addition of $SO_2$ up to its end.

The sulfite can either be produced by introducing $SO_2$ into an ammonia solution until a pH of about 3.5–4.5 is reached, or the amonium sulfite may be formed right in the polymerization solution by adding to it ammonia and $SO_2$ until the pH has risen to 3.5–4.5.

The polymerizates obtained when proceeding in accordance with this invention are remarkably free from low molecular products. Their solutions are well adapted for use and the filaments or the like produced from them possess particularly favorable properties and are absolutely colorless.

In the operation of my invention I may for instance proceed as follows:

Example 1

I introduce into 400 g. water 0.25 g. ammonium persulfate and a solution of ammonium sulfite which has been formed by introducing into 0.35 g. of a 35% ammonia solution $SO_2$ and which has been adjusted to a pH of 3.8. To this mixture 50 g. acrylic acid nitrile are added drop by drop at a temperature of 38° C. I then heat one half-hour to 40° C., while maintaining the pH at 3.8–4.2, and during another hour raise the temperature to 80° C. I then introduce into the mixture so much $SO_2$ that after thirty minutes the pH becomes 1. In order to maintain a strongly acid medium, $SO_2$ in excess is introduced.

After the polymerization has come to an end, a polymerisate is obtained that can easily be filtered and on being dissolved in suitable solvents such as for instance dimethylformamide, forms a readily spinnable solution. The filaments obtained from this solution are particularly clear and light-colored and have an excellent stretching capacity.

Example 2

0.25 g. ammonium persulfate are dissolved in 400 g. water. To this solution is added an ammonium sulfite solution with a pH of 3.8 prepared by introducing $SO_2$ into 0.35 g. of a 35% ammonia solution. Into the mixture are introduced dropwise 50 g. acrylic acid nitrile, the temperature being maintained at 38° C. and the pH at about 4.

Polymerization begins after a few minutes and the polymerizate is precipitated as a fine powder. When the main reaction has come to an end, $SO_2$ is further introduced under constant stirring, the pH remaining at about 1. The solution is heated one hour to about 70° C. After introducing $SO_2$ during two hours the mixture is filtered and worked up as usual.

The polymerizate obtained has a K-value of about 88 and on being dissolved in dimethylformamide or the like forms dispersions which are well flowable in cold condition. On being heated they yield a spinning solution practically free from gels. Clear, easily stretchable filaments can be produced with its aid.

Example 3

Instead of the ammonium persulfate used as starting material I may use 0.2 g. ammonium perborate. I obtain a mixture having a pH of 4 and keep it at 36° C. and for polymerization add 45 g. acrylic acid nitrile and 5 g. acrylic acid amide which were previously dissolved in water. After the main reaction has come to an end, the mixture is heated to 75° C. while continuing the introduction of $SO_2$ and maintaining a pH of about 1. The K-value of the polymerizate thus obtained is about 90. The filaments obtained from solutions of this product are very light colored and are easily stretchable.

Various changes may be made in the proportions, temperatures and other conditions of operation without departing from the invention or sacrificing the advantages thereof.

I claim:

1. The two-stage method of polymerizing acrylonitrile to obtain a polymer substantially free from low molecular weight polymers which comprises (1) adding acrylonitrile gradually to an aqueous solution of a per-compound selected from the group consisting of ammonium per sulfate and ammonium per borate and containing ammonium sulfite, while heating said solution to a temperature of between about 35° and 40° C., while maintaining the pH of said solution in the range 3.5 to 4.5 for approximately one half hour until the initial polymerization reaction is substantially completed, and then (2) raising the temperature of the polymerization mixture to about 65–80° C. and then introducing sulfur dioxide into the mixture until the pH reaches a value of about 1, and continuing the heating and addition of sulfur dioxide until completion of the polymerization.

2. The two-stage method of polymerizing acrylonitrile to obtain a polymer substantially free from low molecular weight polymers which comprises (1) adding acrylonitrile gradually to a dilute aqueous solution of ammonium persulfate and ammonium sulfite while maintaining the temperature of said solution at about 40° C. and the pH thereof at about 4, for approximately one-half hour until the initial polymerization reaction is substantially completed, and then (2) raising the temperature of the polymerization mixture to about 80° C. and then introducing sulfur dioxide into the mixture until the pH reaches a value of about 1, for a period of about one-half hour.

3. The two-stage method of polymerizing acrylonitrile to obtain a polymer substantially free from low molecular weight polymers which comprises (1) introducing sulfur dioxide into a solution of ammonia and mixing the resulting product with a solution of ammonium persulfate to obtain a combined solution having a pH of about 4, introducing acrylonitrile gradually while maintaining the temperature of the mixture at 38° C. for approximately one-half hour until the initial polymerization reaction is substantially completed, and then (2) introducing sulfur dioxide into the mixture with stirring until the pH reaches a value of about 1, maintaining the temperature at about 70° C., and separating the polymerized acrylonitrile.

References Cited in the file of this patent

UNITED STATES PATENTS

| | | |
|---|---|---|
| 2,462,354 | Brubaker et al. | Feb. 22, 1949 |
| 2,628,223 | Richards | Feb. 10, 1953 |